(12) United States Patent
Chen et al.

(10) Patent No.: US 11,928,449 B2
(45) Date of Patent: Mar. 12, 2024

(54) INFORMATION PROCESSING METHOD, DEVICE, APPARATUS AND SYSTEM, MEDIUM, AND PROGRAM

(71) Applicants: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

(72) Inventors: Chunxiu Chen, Suzhou (CN); Jiale Li, Suzhou (CN); Jingkai Wu, Suzhou (CN); Zhiling Hu, Suzhou (CN)

(73) Assignees: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 18/246,712

(22) PCT Filed: Oct. 22, 2021

(86) PCT No.: PCT/CN2021/125740
§ 371 (c)(1),
(2) Date: Mar. 27, 2023

(87) PCT Pub. No.: WO2022/095734
PCT Pub. Date: May 12, 2022

(65) Prior Publication Data
US 2023/0273782 A1    Aug. 31, 2023

(30) Foreign Application Priority Data
Nov. 4, 2020  (CN) .......................... 202011215211.9

(51) Int. Cl.
*G06F 8/61*  (2018.01)
*H04L 9/40*  (2022.01)

(52) U.S. Cl.
CPC ............ *G06F 8/61* (2013.01); *H04L 63/0823* (2013.01)

(58) Field of Classification Search
CPC ..... G06F 8/61; G06F 8/60; G06F 9/46; H04L 63/0823; H04L 67/10; H04L 45/563; H04L 67/01
(Continued)

(56) References Cited

U.S. PATENT DOCUMENTS 7,770,001 B2 *  8/2010  Milton .................. G06F 21/121
                                                        713/156
8,484,716 B1 *  7/2013  Hodgson ................ H04L 63/02
                                                          726/11
(Continued)

FOREIGN PATENT DOCUMENTS

CN        106886434 A      6/2017
CN        107295078 A     10/2017
(Continued)

OTHER PUBLICATIONS

Written Opinion cited in PCT/CN2021/125740, dated Jan. 5, 2022, 7 pages.
(Continued)

*Primary Examiner* — Thu Ha T Nguyen
(74) *Attorney, Agent, or Firm* — Cooper Legal Group, LLC

(57) ABSTRACT

An embodiment of the present application discloses an information processing method, device and apparatus, a medium, and a program. The information processing method is applicable to a first edge node, and comprises: acquiring attribute information of the first edge node and the number
(Continued)

of nodes of a node group to which the first edge node belongs, and generating registration request information on the basis of the attribute information and the number of nodes, wherein the node group comprises the first edge node and a second edge node having the same attribute information; sending the registration request information to a management platform; receiving an authentication certificate and a first installation package sent by the management platform and corresponding to the registration request information, and installing a first application on the basis of the authentication certificate and the first installation package; and controlling, by means of a remote control module in the first application, the second edge node to install the first application. The embodiment of the present application can simplify registration processes in the cloud for edge nodes of the same type.

11 Claims, 10 Drawing Sheets

(58) Field of Classification Search
USPC ......................................................... 709/225
See application file for complete search history.

(56) References Cited

U.S. PATENT DOCUMENTS

| | | | | |
|---|---|---|---|---|
| 10,637,665 | B1* | 4/2020 | Sundaresan | H04L 63/083 |
| 11,275,147 | B1* | 3/2022 | Kalkunte | G01S 13/86 |
| 11,340,956 | B2* | 5/2022 | Liu | H04L 47/83 |
| 11,522,720 | B1* | 12/2022 | Belton | G06F 21/44 |
| 11,606,359 | B1* | 3/2023 | Virtser | H04L 63/123 |
| 11,611,622 | B1* | 3/2023 | Balmakhtar | H04L 67/141 |
| 11,777,870 | B1* | 10/2023 | Akkapeddi | H04L 47/783 709/226 |
| 2002/0049841 | A1* | 4/2002 | Johnson | H04L 67/10 709/225 |
| 2004/0199768 | A1* | 10/2004 | Nail | H04L 9/3247 713/169 |
| 2006/0106836 | A1* | 5/2006 | Masugi | G06F 21/33 |
| 2008/0004119 | A1* | 1/2008 | Van Luchene | A63F 13/63 463/42 |
| 2008/0301770 | A1* | 12/2008 | Kinder | H04L 67/34 726/2 |
| 2013/0254248 | A1 | 9/2013 | Chang | |
| 2015/0095995 | A1* | 4/2015 | Bhalerao | H04L 63/0823 726/6 |
| 2015/0193600 | A1* | 7/2015 | Matsuda | H04L 63/0823 726/9 |
| 2015/0312233 | A1* | 10/2015 | Graham, III | H04L 63/0435 713/171 |
| 2015/0381756 | A1* | 12/2015 | Lotfallah | H04L 67/568 709/213 |
| 2017/0052773 | A1* | 2/2017 | Deselaers | G06F 9/455 |
| 2017/0195332 | A1* | 7/2017 | Wu | H04L 63/0876 |
| 2018/0077147 | A1* | 3/2018 | Kelsey | H04L 9/3231 |
| 2018/0331916 | A1 | 11/2018 | Damaggio et al. | |
| 2020/0007615 | A1* | 1/2020 | Brebner | G06F 9/542 |
| 2020/0084202 | A1* | 3/2020 | Smith | H04L 41/5003 |
| 2020/0097279 | A1* | 3/2020 | Mukhopadhyay | G06F 8/65 |
| 2020/0174770 | A1* | 6/2020 | Jenson | H04L 67/02 |
| 2021/0005330 | A1* | 1/2021 | Patil | H04L 67/12 |
| 2021/0006636 | A1* | 1/2021 | Koehler | H04L 41/0806 |
| 2021/0044429 | A1* | 2/2021 | Yang | G06V 10/95 |
| 2021/0133074 | A1* | 5/2021 | Järvinen | G06F 11/3006 |
| 2021/0144517 | A1* | 5/2021 | Guim Bernat | H04L 67/10 |
| 2021/0157560 | A1* | 5/2021 | Orozco | G06F 11/3688 |
| 2021/0177259 | A1* | 6/2021 | Behuria | H04L 67/1097 |
| 2021/0288886 | A1* | 9/2021 | Örtenblad | H04W 40/02 |
| 2021/0297410 | A1* | 9/2021 | Zhou | H04W 12/06 |
| 2022/0141662 | A1* | 5/2022 | Liao | H04L 63/10 726/1 |
| 2022/0173901 | A1* | 6/2022 | Garcia Valenzuela | H04L 63/10 |
| 2022/0206772 | A1* | 6/2022 | Akiona | H04L 63/18 |
| 2022/0377131 | A1* | 11/2022 | Szilagyi | H04L 41/0894 |
| 2022/0400532 | A1* | 12/2022 | Kalkunte | H04W 24/04 |
| 2023/0035010 | A1* | 2/2023 | Kalkunte | H04B 17/373 |
| 2023/0070253 | A1* | 3/2023 | Rajadurai | H04W 12/06 |
| 2023/0224242 | A1* | 7/2023 | Hashimoto | H04L 63/08 709/238 |
| 2023/0239343 | A1* | 7/2023 | Ge | H04L 67/1031 709/203 |
| 2023/0254215 | A1* | 8/2023 | Gupta | H04L 41/342 709/223 |
| 2023/0269135 | A1* | 8/2023 | Gupta | G06F 8/60 709/222 |
| 2023/0273291 | A1* | 8/2023 | Ozturk | G01S 13/003 342/52 |
| 2023/0273782 | A1* | 8/2023 | Chen | H04L 67/10 709/225 |
| 2023/0281533 | A1* | 9/2023 | Cella | G06Q 10/06315 705/7.25 |

FOREIGN PATENT DOCUMENTS

| | | |
|---|---|---|
| CN | 107547519 A | 1/2018 |
| CN | 109845226 A | 6/2019 |
| CN | 110196722 A | 9/2019 |
| CN | 110633144 A | 12/2019 |
| CN | 110944330 A | 3/2020 |
| CN | 111381835 A | 7/2020 |
| WO | 2018121249 A1 | 7/2018 |
| WO | 2020057163 A1 | 3/2020 |

OTHER PUBLICATIONS

International Search Report in the international application No. PCT/CN2021/125740, dated Jan. 5, 2022, 6 pages.
First Office Action of the Chinese application No. 202011215211.9, dated Oct. 10, 2022 15 pages.
Notice of Allowance of the Chinese application No. 202011215211. 9, dated Mar. 9, 2023, 2 pages.

* cited by examiner

INFORMATION PROCESSING METHOD, DEVICE, APPARATUS AND SYSTEM, MEDIUM, ANDPROGRAM

CROSS-REFERENCE TO RELEVANT APPLICATIONS

This is a national phase application of International Application No. PCT/CN2021/125740, filed on Oct. 22, 2021, which claims priority to Chinese Patent Application No. 202011215211.9, filed on Nov. 4, 2020 The contents of International Application No. PCT/CN2021/125740 and Chinese Patent Application No. 202011215211.9 are incorporated herein by reference in their entireties.

TECHNICAL FIELD

The present disclosure relates to the field of Internet of Things, and more particularly, to a method for information processing, an apparatus, a device, a system, a medium and a program.

BACKGROUND

In the Internet of Things, the cloud generally provides a unified management platform to manage edge nodes, and manages multiple applications and/or devices through the edge nodes to realize a nearest-end service for processing data. In related technologies, the edge nodes need to register on the cloud before accessing the cloud, and download and install related user software through the cloud to manage related applications and/or devices. Therefore, there may be a phenomenon that the edge nodes need to register, download and install related user software on the cloud one by one before accessing the cloud, which leads to cumbersome and time-consuming process for the edge nodes to register and download related applications on the cloud.

SUMMARY

Embodiments of the present disclosure provide a method for information processing, an apparatus, a device, a system, a medium and a program, which simplify a registration process of edge nodes of the same type on the cloud and shorten registration time at the same time.

The technical solution of the present disclosure is realized as follows.

A method for information processing is applicable to a first edge node and includes the following operations.

Attribute information of the first edge node and a number of nodes in a node group including the first edge node are acquired, and registration request information is generated based on the attribute information and the number of nodes. The node group includes the first edge node and a second edge node with the same attribute information.

The registration request information is sent to a management platform.

An authentication certificate and a first installation package corresponding to the registration request information sent by the management platform are received, and a first application is installed based on the authentication certificate and the first installation package.

The second edge node is controlled to install the first application through a remote control module in the first application.

In some embodiments of the present disclosure, the operation that the second edge node is controlled to install the first application through the remote control module in the first application includes the following operations.

Access information for accessing the second edge node is received, and an access manner is determined based on the access information.

The first installation package is parsed and a second installation package is generated.

The second installation package is sent to the second edge node in the access manner through the remote control module, and the second edge node is controlled to install the first application based on the second installation package.

In some embodiments of the present disclosure, after the operation that the first application is installed based on the authentication certificate and the first installation package, the method also includes the following operations.

First access information is sent to the management platform through the first application based on an identity transport protocol, and the first access information is used for the management platform to verify whether the first edge node is accessed normally.

The embodiments of the disclosure also provide a method for information processing, which is applicable to a management platform and includes the following operations.

Registration request information sent by a first edge node is received, and an authentication certificate and a first installation package corresponding to the registration request information are generated.

The authentication certificate and the first installation package are sent to the first edge node.

First access information sent by the first edge node and second access information sent by a second edge node are received. The first edge node and the second edge node belong to the same node group, and attribute information of the first edge node and the second edge node is the same.

Status information of nodes is updated in response to determining that edge nodes in the node group are accessed normally based on the first access information and the second access information.

In some embodiments of the present disclosure, the operation that the first access information sent by the first edge node and the second access information sent by the second edge node are received includes the following operations.

Based on an identity transport protocol, the first access information sent by the first edge node through a first application on the first edge node is received.

Based on the identity transport protocol, the second access information sent by the second edge node through a first application on the second edge node is received. The first application on the first edge node has a first function and a second function, and the first application on the second edge node has the second function.

In some embodiments of the present disclosure, the operation that it is determined the edge nodes in the node group are accessed normally based on the first access information and the second access information includes the following operations.

Node group information is acquired from the first access information and the second access information.

It is determined that the edge nodes in the node group are accessed normally based on the node group information.

In some embodiments of the present disclosure, after the status information of the nodes is updated, the method also includes the following operations.

A node message queue is opened.

Based on the node message queue, first keep-alive information sent by the first edge node and second keep-alive information sent by the second edge node are received according to a first preset period.

The embodiments of the disclosure also provide a method for information processing, which is applicable to a second edge node and includes the following operations.

Access information is sent to a first edge node.

Based on the access information, a second installation package sent by the first edge node is received, and a first application is installed based on the second installation package.

Second access information is sent to a management platform through the first application based on an identity transport protocol, and the second access information is used for the management platform to verify whether the second edge node is accessed normally.

The present embodiment provides a device for information processing, which includes a first generation module, a first sending module, a first receiving module and a control module.

The first generation module is configured to acquire attribute information of a first edge node and a number of nodes in a node group including the first edge node, and generate registration request information based on the attribute information and the number of nodes. The node group includes the first edge node and a second edge node with the same attribute information.

The first sending module is configured to send the registration request information to a management platform.

The first receiving module is configured to receive an authentication certificate and a first installation package corresponding to the registration request information sent by the management platform, and install a first application based on the authentication certificate and the first installation package.

The control module is configured to control, through a remote control module in the first application, the second edge node to install the first application.

The present embodiment also provides a device for information processing, which includes a second generation module, a second sending module, a second receiving module and an updating module.

The second generation module is configured to receive registration request information sent by a first edge node, and generate an authentication certificate and a first installation package corresponding to the registration request information.

The second sending module is configured to send the authentication certificate and the first installation package to the first edge node.

The second receiving module is configured to receive first access information sent by the first edge node and second access information sent by a second edge node. The first edge node and the second edge node belong to the same node group, and attribute information of the first edge node and the second edge node is the same.

The updating module is configured to update status information of nodes in response to determining that edge nodes in the node group are accessed normally based on the first access information and the second access information.

The present embodiment also provides a device for information processing, which includes a third sending module and a third receiving module.

The third sending module is configured to send access information to a first edge node.

The third receiving module is configured to receive a second installation package sent by the first edge node based on the access information, and install a first application based on the second installation package.

The third sending module is configured to send, through the first application based on an identity transport protocol, second access information to a management platform, and the second access information is used for the management platform to verify whether a second edge node is accessed normally.

The embodiments of the present disclosure also provide a first edge node, which includes a first processor, a first memory and a first communication bus. The first communication bus is configured to implement communication connection between the first processor and the first memory.

The first processor is configured to execute a program in the first memory to implement any of the methods for information processing applicable to the first edge node.

The embodiments of the present disclosure also provide a management platform, which includes a second processor, a second memory and a second communication bus. The second communication bus is configured to implement communication connection between the second processor and the second memory.

The second processor is configured to execute a program in the second memory to implement any of the methods for information processing applicable to the management platform.

The embodiments of the present disclosure also provide a second edge node, which includes a third processor, a third memory and a third communication bus. The third communication bus is configured to implement communication connection between the third processor and the third memory The third processor is configured to execute a program in the third memory to implement any of the methods for information processing applicable to the second edge node.

The embodiments of the present disclosure also provide a computer-readable storage medium, which has one or more programs that, when executed by one or more processors, implement the above methods for information processing.

The embodiments of the present disclosure also provide a system for information processing, which includes the first edge node, the management platform and the second edge node mentioned above.

The embodiments of the present disclosure also provide a computer program, which includes computer-readable codes. When the computer readable codes run in a first edge node or a management platform or a second edge node, a processor of the first edge node is configured to execute to implement the method for information processing applicable to the first edge node, or a processor of the management platform is configured to execute to implement the method for information processing applicable to the management platform, or a processor of the second edge node is configured to execute to implement the method for information processing applicable to the second edge node.

The embodiments of the present disclosure provide a method for information processing, an apparatus, a device, a system, a medium and a program, attribute information of a first edge node and a number of nodes in a node group including the first edge node are acquired, and registration request information is generated based on the attribute information and the number of nodes, where the node group includes the first edge node and a second edge node with the same attribute information; the registration request information is sent to a management platform; an authentication certificate and a first installation package corresponding to the registration request information sent by the management platform are received, and a first application is installed based on the authentication certificate and the first installation package, where the first application on the first edge node has a first function and a second function; the second edge node is controlled to install the first application through a remote control module in the first application, where the first application on the second edge node has the second function. In this way, by dividing edge nodes of the same type into a group and performing batch registration on the management platform, instead of, as in the related art, requiring the edge nodes to register, download and install related user software on the cloud one by one, the registration process of edge nodes of the same type on the cloud is simplified and registration time is also shorten.

In order to make the above objects, features and advantages of the present disclosure more apparent and understood, preferred embodiments are set forth below and are described in detail with reference to the accompanying drawings.

BRIEF DESCRIPTION OF THE DRAWINGS

In order to more clearly illustrate the technical solutions of the embodiments of the present disclosure, the accompanying drawings required for use in the embodiments will be briefly introduced below. The accompanying drawings, which are incorporated in and constitute a part of this specification, illustrate embodiments consistent with the application and together with the specification serve to illustrate the technical solutions of the present disclosure. It should be understood that the following accompanying drawings merely illustrate some embodiments of the disclosure, and should not be considered to limit the scope. Other relevant accompanying drawings may further be obtained by those of ordinary skill in the art according to these drawings without creative work.

DETAILED DESCRIPTION

The technical solutions in the embodiment of the present disclosure will be clearly and completely described below with reference to the accompanying drawings in the embodiment of the present disclosure.

It is to be understood that "an embodiment of the disclosure" or "the foregoing embodiment" mentioned in the whole specification means that specific features, structures or characteristics related to the embodiment are included in at least one embodiment of the disclosure. Therefore, "in an embodiment" or "in the foregoing embodiment" used in the whole specification does not always refer to the same embodiment. In addition, these specific features, structures or characteristics may be combined in one or more embodiments freely as appropriate. It is to be understood that, in each embodiment of the disclosure, a magnitude of a sequence number of each process does not mean an execution sequence and the execution sequence of each process should be determined by its function and an internal logic and should not form any limit to an implementation process of the embodiments of the disclosure. The sequence numbers of the embodiments of the disclosure are adopted not to represent superiority-inferiority of the embodiments but only for description.

In order to understand the features and technical content of the embodiments of the present disclosure in more detail, the implementation of the embodiments of the present disclosure will be described in detail below in combination with the accompanying drawings. The attached drawings are for reference only and are not intended to limit the present disclosure.

Figure 1:
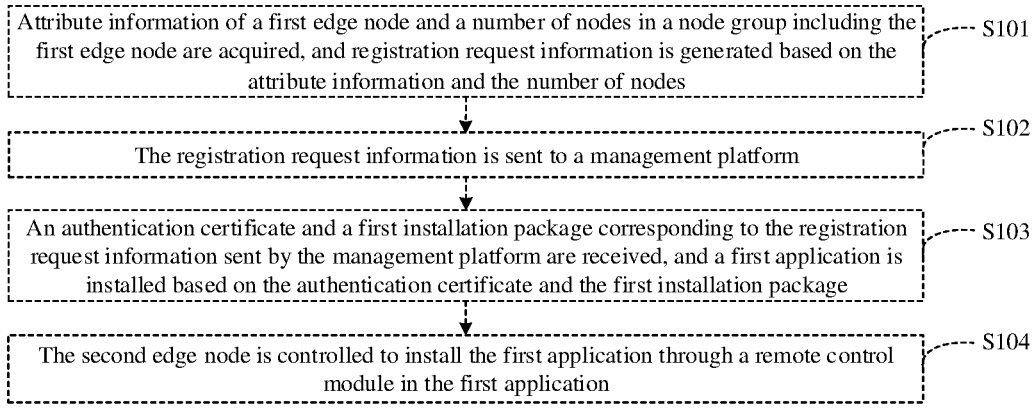
FIG. 1 is a schematic flowchart of a method for information processing according to an embodiment of the present disclosure.

The embodiments of the present disclosure provide a method for information processing, which is applicable to a first edge node. Referring to FIG. 1, the method includes the following operations.

In S101, attribute information of the first edge node and a number of nodes in a node group including the first edge node are acquired, and registration request information is generated based on the attribute information and the number of nodes.

The node group includes the first edge node and a second edge node with the same attribute information.

In some embodiments of the present disclosure, the attribute information of the first edge node may include, but is not limited to, the following information: Internet Protocol (IP), operating system, kernel version or Central Processing Unit (CPU) of the first edge node, and the attribute information of the first edge node may also be attribute information of a user equipment accessed to the first edge node. The present disclosure does not limit the specific reference to the attribute information of the first edge node.

In some embodiments of the present disclosure, in response to the attribute information of the first edge node and the second edge node being the same, the first edge node and the second edge node are classified as edge nodes of the same type, that is, they belong to the same node group. The number of edge nodes in a node group may include at least one.

In some embodiments of the present disclosure, the content of the registration request information may include, but is not limited to, attribute information of edge nodes in the node group and the number of edge nodes in the node group including the first edge node. The content of the registration request information may also include the positional relationship between edge nodes and the like.

In S102, the registration request information is sent to a management platform.

In some embodiments of the present disclosure, the management platform is provided by a cloud associated with the first edge node and the second edge node, that is, the cloud provides the management platform to manage the first edge node and the second edge node. A sending manner in which the first edge node sends the registration request information is not limited in the present disclosure. Further, the registration request information may be displayed in the form of text, character, image and so on, and the specific form of the registration request information is not limited in present disclosure.

In S103, an authentication certificate and a first installation package corresponding to the registration request information sent by the management platform are received, and a first application is installed based on the authentication certificate and the first installation package.

In some embodiments of the present disclosure, after the first edge node sends the registration request information representing the node group corresponding to the first edge node, the management platform on the cloud generates the authentication certificate and the first installation package corresponding to the registration request information. The first installation package may be an installation package corresponding to the first edge node for installing the first application, i.e., Agent software. In the following embodiments of the present disclosure, the Agent software is used to refer to the first application.

In some embodiments of the present disclosure, the Agent software may include, but is not limited to, the following function modules: an edge application management module, a message processor module, a device control module and a remote control module. The first application on the first edge node has a first function and a second function; the first function may be a function, such as, message processing, device control and the like, and the second function may be a function, such as, remote control and the like.

In S104, the second edge node is controlled to install the first application through a remote control module in the first application.

In some embodiments of the present disclosure, the first edge node may perform information interaction with the second edge node through the internally installed first application. The first edge node may realize information interaction with the second edge node through the remote control module of the first application; and the second edge node installs the first application through information interaction between the first edge node and the second edge node.

In some embodiments of the present disclosure, the first application on the second edge node is different from the first application on the first edge node in function implementation, where the first application on the second edge node may include an edge application management module, a message processor module, a device control module and so on. In other words, the first application on the second edge node has the second function; that is, the first application on the second edge node has a function, such as, edge application management, message processing, device control and the like.

In the method for information processing provided by the embodiments of the present disclosure, attribute information of a first edge node and a number of nodes in a node group including the first edge node are acquired, and registration request information is generated based on the attribute information and the number of nodes, where the node group includes the first edge node and a second edge node with the same attribute information; the registration request information is sent to a management platform; an authentication certificate and a first installation package corresponding to the registration request information sent by the management platform are received, and a first application is installed based on the authentication certificate and the first installation package, where the first application on the first edge node has a first function and a second function; and the second edge node is controlled to install the first application through a remote control module in the first application, where the first application on the second edge node has the second function. In this way, by dividing edge nodes of the same type into a group and performing batch registration on the management platform, instead of, as in the related art, requiring the edge nodes to register, download and install related user software on the cloud one by one, the registration process of edge nodes of the same type on the cloud is simplified and registration time is also shorten.

Figure 2:
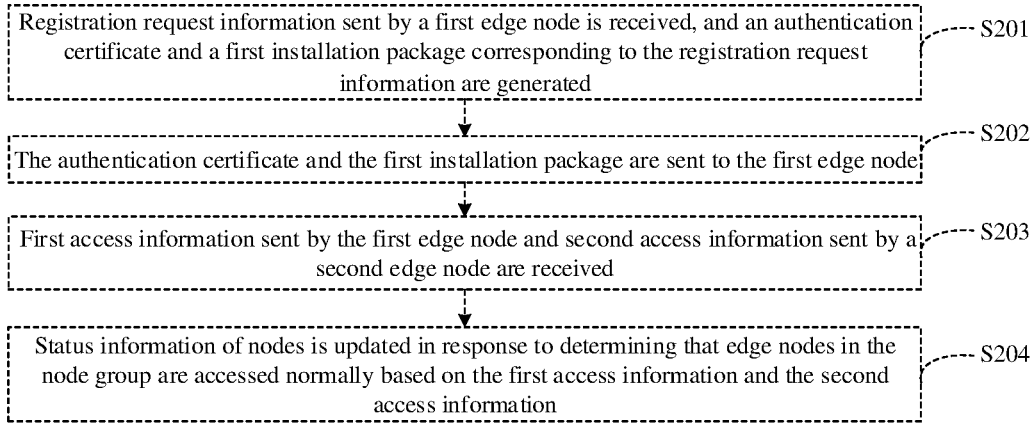
FIG. 2 is a schematic flowchart of another method for information processing according to an embodiment of the present disclosure.

Based on the foregoing embodiments, the embodiments of the present disclosure provide a method for information processing, which is applicable to a management platform. Referring to FIG. 2, the method includes the following operations.

In S201, registration request information sent by a first edge node is received, and an authentication certificate and a first installation package corresponding to the registration request information are generated.

In some embodiments of the present disclosure, the management platform is provided by a cloud that interacts information with a first edge node. The management platform receives the registration request information sent by any edge node that needs to access the management platform, and receives a keep-alive message and device message sent by any edge node after the edge node successfully registers on the management platform.

The management platform may generate the authentication certificate corresponding to the registration request information through an internal certificate management module, and the management platform may generate the first installation package of Agent software corresponding to the registration request information through an internal node software management module, and send the first installation package to be downloaded to the first edge node.

In S202, the authentication certificate and the first installation package are sent to the first edge node.

In some embodiments of the present disclosure, the management platform sends the generated authentication certificate and first installation package through information interaction with the first edge node.

In S203, first access information sent by the first edge node and second access information sent by a second edge node are received.

The first edge node and the second edge node belong to the same node group, and attribute information of the first edge node and the second edge node is the same.

In some embodiments of the present disclosure, the management platform receives the first access information sent by the first edge node and the second access message sent by the second edge node after sending the authentication certificate and the first installation package to the first edge node.

The first access information is information sent by the first edge node after successful registration on the cloud, and the management platform verifies whether the first edge node is accessed normally to the management platform based on the first access information. The second access information is information sent by the second edge node after successful registration on the cloud, and the management platform verifies whether the second edge node is accessed normally to the management platform based on the second access information. The first access information and the second access information may include, but are not limited to, attribute information, registration order of the corresponding first edge node and second edge node.

In some embodiments of the present disclosure, the management platform may verify the first access information and the second access information through an internal access control module, thereby verifying whether the first edge node and the second edge node are accessed normally.

In S204, status information of nodes is updated in response to determining that edge nodes in the node group are accessed normally based on the first access information and the second access information.

In some embodiments of the present disclosure, firstly, the management platform parses the acquired first access information and second access information through the internal access control module to acquire a parsing result: a node group message. The node group message may be node group information corresponding to the first edge node and the second edge node; secondly, the management platform, through the node group information, acquires and determines whether the number of edge nodes successfully accessing the cloud in the node group reaches the upper limit of the access number allowed by the corresponding node group.

In some embodiments of the present disclosure, the access control module within the management platform determines the number of the acquired first access information and second access information, and determines whether the number is less than or equal to the number of nodes in the registration request information. If so, it is determined that the node group is accessed normally to the management platform, that is, the access of the node group belongs to legal access and successful access; otherwise, the access of the node group belongs to illegal access, and the cloud sends an alarm to notify the corresponding edge nodes at the same time.

In some embodiments of the present disclosure, the first access information is access information of the first edge node successfully accessed to the management platform, and at the same time, the second access information may be the access number of the second edge nodes successfully accessed to the management platform, and based on the first access information and the second access information, the management platform determines the number of edge nodes in the node group including the first edge node successfully accessed to the management platform, that is, the first number; then the management platform matches the first number with the number of edge nodes in the node group including the first edge node indicated in the registration request information sent by the first edge node, and determines whether the node group is accessed normally based on the matching result.

In response to successful access of the node group corresponding to the first edge node, the management platform updates the status information of the edge node in the node group corresponding to the first edge node through the internal node management module. The status information of the node includes the corresponding node status, IP and kernel version of the first edge node and the second edge node.

In the method for information processing provided by the embodiments of the present disclosure, registration request information sent by a first edge node is received, and an authentication certificate and a first installation package corresponding to the registration request information are generated; the authentication certificate and the first installation package are sent to the first edge node; first access information sent by the first edge node and second access information sent by a second edge node are received, where the first edge node and the second edge node belong to the same node group, and attribute information of the first edge node and the second edge node is the same; and status information of nodes is updated in response to determining that edge nodes in the node group are accessed normally based on the first access information and the second access information. In this way, by dividing edge nodes of the same type into a group and performing batch registration on the management platform, instead of, as in the related art, requiring the edge nodes to register, download and install related user software on the cloud one by one, the registration process of edge nodes of the same type on the cloud is simplified and registration time is also shorten.

Figure 3:
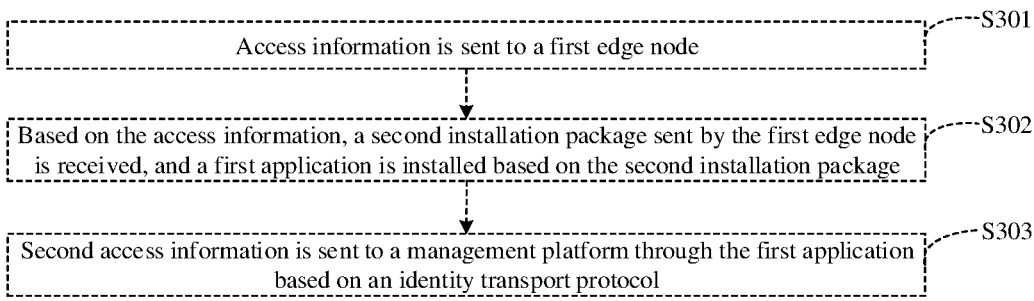
FIG. 3 is a schematic flowchart of another method for information processing according to an embodiment of the present disclosure.

Based on the foregoing embodiments, the embodiments of the present disclosure provide a method for information processing, which is applicable to a second edge node. Referring to FIG. 3, the method includes the following operations.

In S301, access information is sent to a first edge node.

In some embodiments of the present disclosure, the access information is information used by the first edge node to access the second edge node.

In some embodiments of the present disclosure, the access information includes an access manner in which the first edge node remotely accesses the second edge node through an internal remote control module.

In some embodiments of the present disclosure, the first edge node stores acquired access information of the second edge node according to a preset rule, and stores the access information to a specific directory within the first edge node.

In S302, based on the access information, a second installation package sent by the first edge node is received, and a first application is installed based on the second installation package.

In some embodiments of the present disclosure, the first edge node accesses the corresponding second edge node through the acquired access information and sends the second installation package for installing Agent software to the second edge node. The second installation package is determined through parsing the first installation package by the first edge node, and the first application on the first edge node is different from the first application on the second edge node in function implementation.

In some embodiments of the present disclosure, the first application on the first edge node and the first application on the second edge node may have different versions.

In S303, second access information is sent to a management platform through the first application based on an identity transport protocol.

The second access information is used for the management platform to verify whether the second edge node is accessed normally.

In some embodiments of the present disclosure, the second edge node sends related information to the management platform through the installed first application. Information indicating successful registration of the second edge node may be sent to the management platform through the message processor in the first application.

The identity transport protocol may be Transport Layer Security (TLS).

In some embodiments of the present disclosure, the second access information is information generated after the second edge node is successfully registered on the management platform provided by the cloud. The management platform may use the second access information to verify whether the second edge node is accessed normally.

In the method for information processing provided by the embodiments of the present disclosure, access information is sent to a first edge node, a second installation package sent by the first edge node is received based on the access information, and a first application is installed based on the second installation package, and second access information is sent to a management platform through the first application based on an identity transport protocol, and the second access information is used for the management platform to verify whether the second edge node is accessed normally. In this way, by dividing edge nodes of the same type into a group and performing batch registration on the management platform, instead of, as in the related art, requiring the edge nodes to register, download and install related user software on the cloud one by one, the registration process of edge nodes of the same type on the cloud is simplified and registration time is also shorten.

Figure 4:
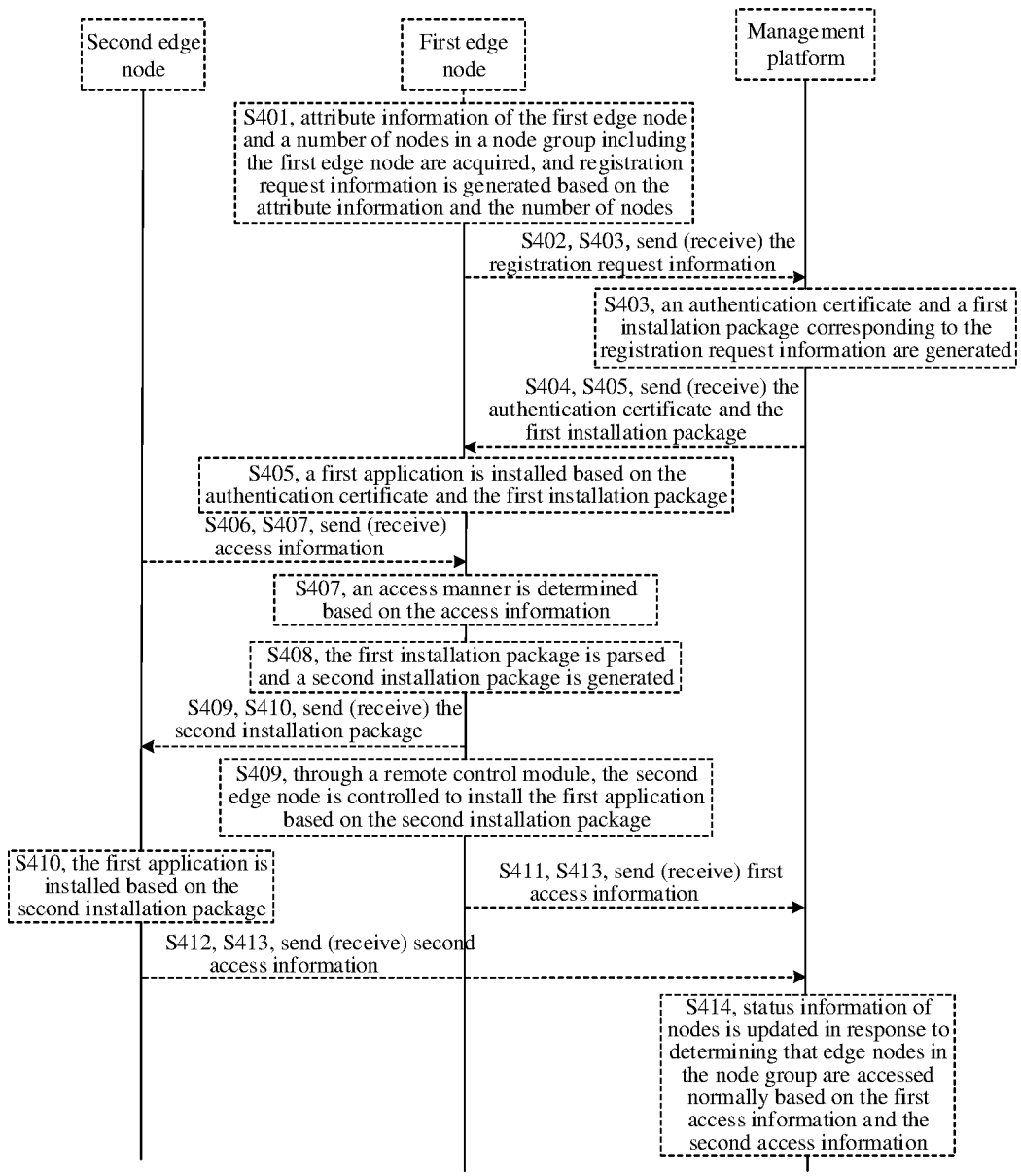
FIG. 4 is a schematic flowchart of another method for information processing according to an embodiment of the present disclosure.

Based on the foregoing embodiments, the embodiments of the present disclosure provide a method for information processing. Referring to FIG. 4, the method includes the following operations.

In S401, a first edge node acquires attribute information of the first edge node and a number of nodes in a node group including the first edge node, and generates registration request information based on the attribute information and the number of nodes.

The node group includes the first edge node and one or more second edge nodes with the same attribute information.

In some embodiments of the present disclosure, the number of nodes in the node group including the first edge node may be the number of second edge nodes in the node group counted by the first edge node plus 1; where the second edge node is any edge node except the first edge node in the node group, and the number of the second edge nodes in the node group may be any positive integer.

In S402, the first edge node sends the registration request information to a management platform.

In S403, the management platform receives the registration request information sent by the first edge node, and generates an authentication certificate and a first installation package corresponding to the registration request information.

Figure 5:
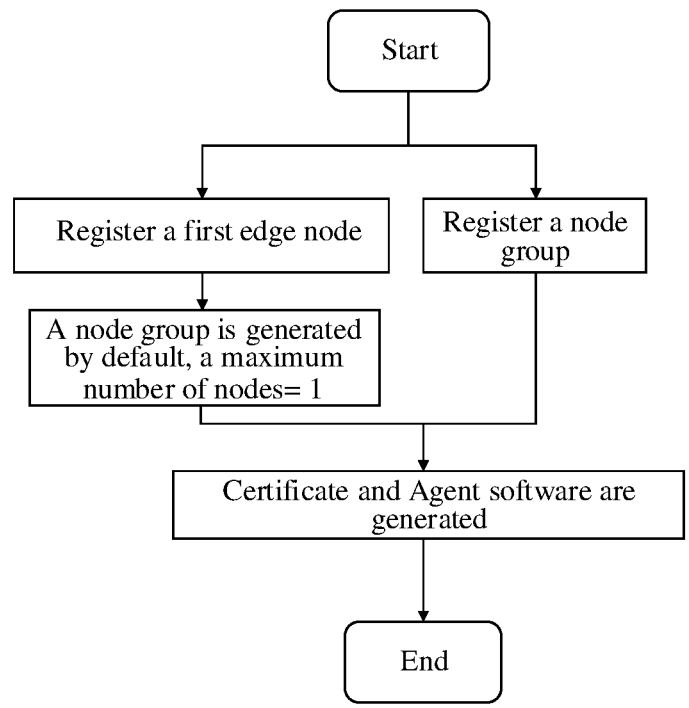
FIG. 5 is a schematic flowchart of a node group registration according to an embodiment of the present disclosure.

As illustrated in FIG. 5, a schematic flowchart of a node group registration is provides. The start step is started, and the registration process is performed, which is divided into two cases, that is, the number of edge nodes in the node group being 1 and the number being not 1. The registration of the edge node or the edge node group is performed correspondingly, that is, first edge node registration and node group registration illustrated in FIG. 5. Node registration is that a node group is generated by default, and an upper limit of the number of nodes in the node group is 1 (=1), which means that there is only one first edge node in the node group in the embodiment of the present disclosure. The first edge node sends the registration request information to the management platform, the management platform generates the authentication certificate and the installation package of the first application corresponding to the registration request information based on the registration request information, that is, generates the certificate and Agent software, and then the management platform sends the generated information to the first edge node to complete the registration operations, i.e. the registration process ends.

In S404, the management platform sends the authentication certificate and the first installation package to the first edge node.

In S405, the first edge node receives the authentication certificate and the first installation package corresponding to the registration request information sent by the management platform, and installs the first application based on the authentication certificate and the first installation package.

The first application on the first edge node has a first function and a second function.

In S406, the second edge node sends access information to the first edge node.

In S407, the first edge node receives the access information for accessing the second edge node, and determines an access manner based on the access information.

In some embodiments of the present disclosure, the first edge node may acquire the access information for accessing the second edge node according to a prompt collection instruction given by the management platform provided by the cloud. The prompt collection instruction is used for prompting to collect the access information of the second edge node.

In some embodiments of the present disclosure, the first edge node parses the access information to acquire an access manner for accessing the second edge node. The access manner may be a remote access manner, remote access may be realized based on a remote connection generated by an application program within the first edge node, or may be realized through a remote desktop connection provided by the internal system of the first edge node, which is not limited in the present disclosure.

In S408, the first edge node parses the first installation package and generates the second installation package.

In some embodiments of the present disclosure, an order in which the first edge node performs the operation in S407 and the operation in S408 may be arbitrarily changed, and the first edge node may also simultaneously perform the operations in S407 and S408.

In S409, the first edge node sends the second installation package to the second edge node in the access manner through the remote control module, and controls the second edge node to install the first application based on the second installation package.

The second installation package is generated by parsing the first installation package.

In some embodiments of the present disclosure, the second installation package is generated through parsing the first installation package obtained from the management platform by the first edge node, and the second installation package and the first installation package are both installation packages corresponding to Agent software.

In S410, the second edge node receives the second installation package sent by the first edge node based on the access information, and installs the first application based on the second installation package.

Figure 6:
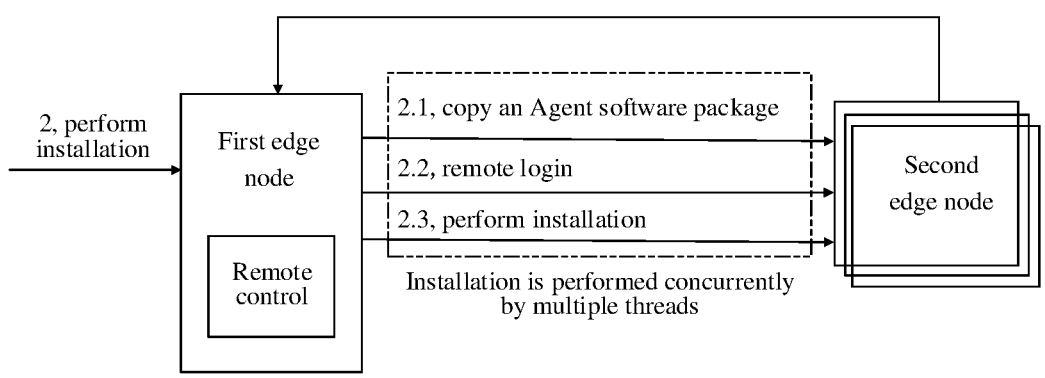
FIG. 6 is a schematic flowchart of performing remote batch control to a second edge node(s) by a first edge node to install a first application according to an embodiment of the present disclosure.

As illustrated in FIG. 6, a schematic flowchart of performing remote batch control to a second edge node(s) by a first edge node to install a first application is provided.

In 1, a user or a first edge node enters remote access information of an edge node to be installed in advance, that is, remote access information of the second edge node(s).

In 2, perform installation: the first edge node performs information interaction with the second edge node(s) through the remote control module of the internal first application; where there is at least one second edge node. It may be realized by the following operations in 2.1 to 2.3. In 2.1, Agent software package without a remote control module is copied to the second edge node; in 2.2, remote login is performed; in 2.3, installation is performed. At the same time, when the node 1 control nodes 2-N to install corresponding Agent software, the installation operations may be performed by multiple threads in parallel.

In S411, the first edge node sends first access information to the management platform through the first application based on the identity transport protocol.

The first access information is used for the management platform to verify whether the first edge node is accessed normally.

In S412, the second edge node sends second access information to the management platform through the first application based on the identity transport protocol.

The second access information is used for the management platform to verify whether the second edge node is accessed normally.

In some embodiments of the present disclosure, the first edge node and the second edge node simultaneously send the corresponding first access information and second access information to the management platform, the management platform analyzes the first access information and the second access information through the internal access control module to determines whether the access number of the edge nodes in the node group corresponding to the first edge node reaches the upper limit. If not, it is determined that the node group corresponding to the first edge node is accessed legally and successfully.

In some embodiments of the present disclosure, the time at which the first edge node performs the operation in S411 may be the same as the time at which the second edge node performs the operation in S412, or the operations in S411 and S412 may be sequentially performed according to an order of the first edge node and the second edge node in the node group. The node group may arranged the first edge node and the second edge node in order according to the physical positions of the edge nodes, and may also arranged the edge nodes in order according to the generation time of the edge nodes.

In S413, the management platform receives the first access information sent by the first edge node and the second access information sent by the second edge node.

The first edge node and the second edge node belong to the same node group; and the attribute information of the first edge node and the second edge node is the same.

In some embodiments of the present disclosure, the operation in S413 performed by the management platform may also be implemented by the following operations in 413a and 413b.

In 413a, the management platform receives the first access information sent by the first edge node through the first application based on the identity transport protocol.

In 413b, the management platform receives the second access information sent by the second edge node through the first application based on the identity transport protocol.

The first application on the first edge node has a first function and a second function, and the first application on the second edge node has the second function.

In S414, the management platform updates status information of nodes in response to determining that edge nodes in the node group are accessed normally based on the first access information and the second access information.

In some embodiments of the present disclosure, the operation that the management platform determines that edge nodes in the node group are accessed normally based on the first access information and the second access information in S414 may be implemented by the following operations in 414a to 414b.

In 414a, the management platform acquires node group information from the first access information and the second access information.

In some embodiments of the present disclosure, the management platform counts and acquires the node group information corresponding to the first edge node, that is, the number of nodes corresponding to the node group information, through the internal access control module. The number of nodes also exists in the registration request information sent by the first edge node to the management platform.

In 414b, the management platform determines that the edge nodes in the node group are accessed normally based on the node group information.

In some embodiments of the present disclosure, the management platform counts the acquired number of nodes and compares with the number of nodes in the registration request information sent by the first edge node, to determine whether the edge nodes in the node group are accessed normally. In response to the number of nodes counted is less than or equal to the number of nodes in the registration request information, it is determined that the edge nodes in the node group are accessed normally; otherwise, the access of the edge nodes belongs to illegal access.

In some embodiments of the present disclosure, the management platform may perform the following operations in S415 and S416 after performing the operation in S414.

In S415, the management platform opens a node message queue.

In some embodiments of the present disclosure, after the management platform determines that each edge node in the node group accesses successfully based on the internal access control module, the access control module opens the node message queue. The node message queue is used for receiving messages reported by applications and/or devices of each edge node that has accessed to the management platform and successfully accessed.

In S416, the management platform receives, based on the node message queue, first keep-alive information sent by the first edge node and second keep-alive information sent by the second edge node according to the first preset period.

In some embodiments of the present disclosure, the management platform may open and close, based on the node message queue, the path for receiving the first keep-alive message and the second keep-alive message according to a certain preset rule. The keep-alive message is used for the management platform to monitor the state of the corresponding edge nodes, and open and close the node message queue synchronously based on the keep-alive message.

In some embodiments of the present disclosure, during information interaction between the management platform and the first edge node and the second edge node, that is, reception of the first access message, the second access message, the first keep-alive message and the second keep-alive message may be encrypted and authenticated by TLS.

Figure 7:
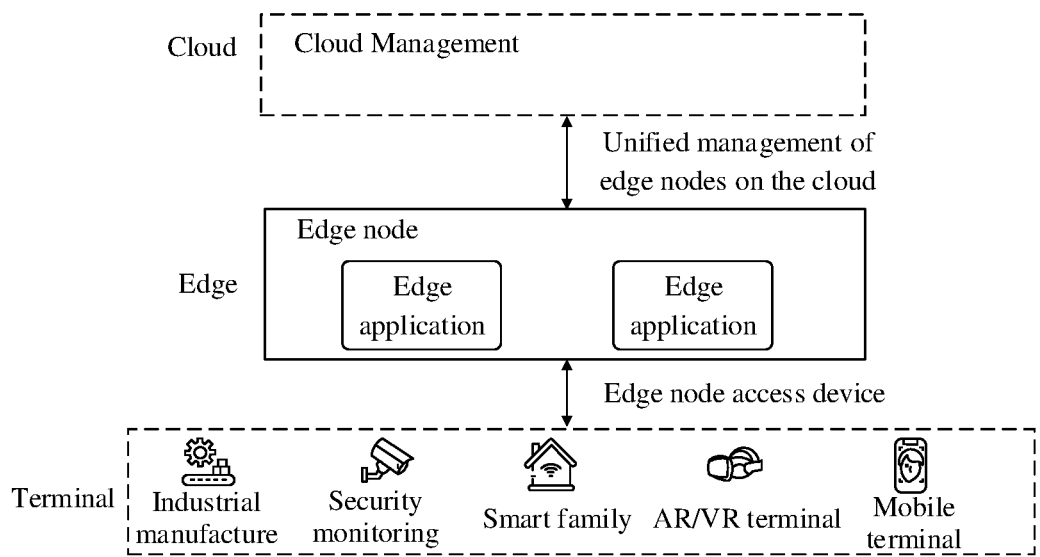
FIG. 7 is a schematic diagram of an edge node management architecture according to an embodiment of the present disclosure.

As illustrated in FIG. 7, a schematic diagram of an edge node management architecture is provided. The edge nodes are connected with the cloud management, that is, the cloud is connected with the edge in FIG. 7. The cloud management is the management platform; the device terminal is edge node access devices, which may include, but are not limited to, terminals associated with industrial manufacturing, security monitoring, smart homes, Augmented Reality (AR)/Virtual Reality (VR) terminals, mobile terminals and the like, as illustrated in FIG. 7; at the same time, the edge nodes manage the devices accessed to the edge nodes through internal edge applications, and the cloud implements the unified management of the edge nodes on the cloud through the cloud management platform.

Figure 8:
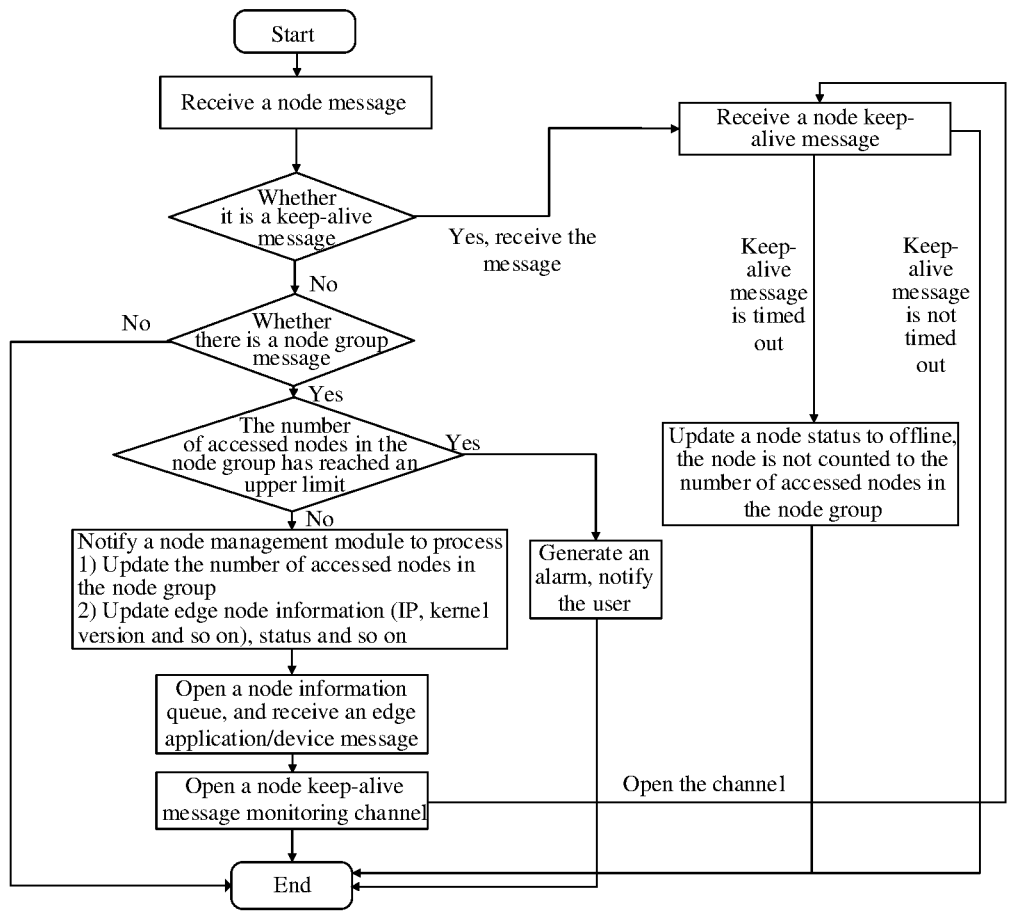
FIG. 8 is a schematic flowchart of performing access control to an edge node according to an embodiment of the present disclosure.

As illustrated in FIG. 8, a schematic flowchart of performing access control to an edge node is provided. The start step is performed. The management platform receives a node message sent by an edge node, that is, receiving information; determines whether the node message is a keep-alive message, if so, receives the node keep-alive message, and determines whether the node keep-alive message is timed out; if the keep-alive message is timed out, updates the node state corresponding to the edge node to be offline, and does not count the edge node to the number of accessed nodes in the node group in such case; if the keep-alive message is not timed out, performs the corresponding operation normally, such as, opening the corresponding information channel, to open the node keep-alive message to monitor the channel, and ends the operation. If the node message is not a keep-alive message, the management platform determines whether the message contains node group information, if so, receives the message and determines whether the number of accessed nodes in the node group reaches the upper limit based on the internal access control module; if the number of accessed nodes in the node group reaches the upper limit, generates alarm information and notifies the user, that is, the corresponding edge node; if not, that is, the number of accessed nodes in the node group does not reach the upper limit, notifies the node management module to perform: 1) updating the number of accessed nodes in the node group; 2) updating the edge node information, that is, IP, kernel version, status information corresponding to the edge nodes, then opens the node message queue and receives the edge application and/or device message corresponding to the edge node, and then opens the node keep-alive message to monitor the channel and ends the operation.

Description of the same operations and contents in the present embodiment as those in other embodiments may refer to the descriptions in other embodiments.

According to the method for information processing provided by the embodiments of the application, edge nodes of the same type are divided into a group and registered in batches on the management platform, and meanwhile, encryption authentication is performed and the number of nodes in the node group is determined when the management platform performs interact information with the edge nodes. In this way, the registration process of edge nodes of the same type on the cloud is simplified, registration time is shorten, and security of management of edge nodes by the cloud may be improved.

Figure 9:
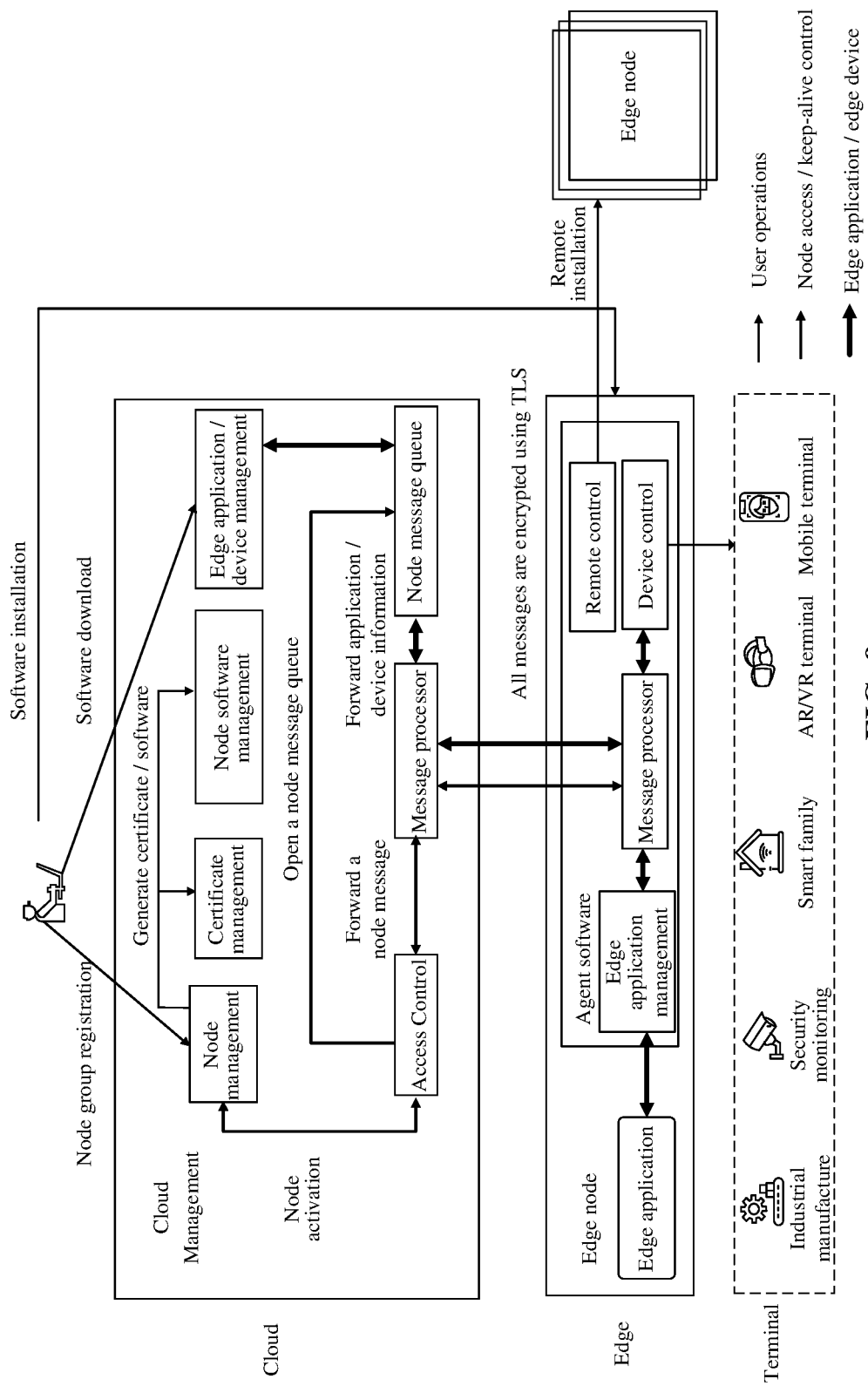
FIG. 9 is a schematic diagram of an edge node group management architecture according to an embodiment of the present disclosure.

As illustrated in FIG. 9, a schematic diagram of an edge node group management architecture is provided. The device terminal includes: terminals associated with industrial manufacturing, security monitoring and smart homes, AR/VR terminals and mobile terminals. The edge terminal, that is, the first edge node, includes an original edge application and Agent software downloaded from the management platform. The Agent software includes an edge application management, message processor, device control, remote control and other modules. The edge application management is to interact with the original edge application to manage the edge application and/or edge device. The message processor is used for the edge application management and the device control to exchange information. The device control is used for managing user equipment of the device terminal accessed to the first edge node, and performing information interaction with the message processor. The remote control is used for controlling the second edge node to remotely install the corresponding Agent software, which may be operated by the user or automatically controlled by the device.

The cloud management platform on the cloud has node management, certificate management, node software management, edge application/device management, access control, message processor, node message queue and other modules. The message processor in the cloud management interacts information with the message processor within the edge node through TLS encryption, and at the same time, the message processor forwards the node access message and the keep-alive message sent by the edge node, and reports and issues data of the application and/or device corresponding to the edge node. The data of the edge application and/or device may be sent from the edge node to the cloud management, that is, the management platform, only after the edge node successfully accesses to the management platform and the node message queue is opened by the access control module; the access control module determines whether the edge node is allowed to access according to the node access message, i.e., the node group message carried in the reported access message, to ensure the access security of the cloud. At the same time, the access control module determines whether to open the node message queue according to the node state within the keep-alive message sent by the edge node, the node message queue is not opened when the edge node is not accessed to the cloud, and the cloud management, that is, the management platform, does not process the data reported by the application and/or device associated with the edge node, so as to ensure that the cloud management capability is merely provided to the edge nodes that have been accessed to the cloud management platform. The cloud management provides a unified download platform of a node software (i.e., the Agent software) for edge nodes through node management, certificate management and node software management, as well as life cycle management for edge nodes and the node group and state management for all edge nodes corresponding to the node group, so as to realize the node group registration function, that is, node activation. At the same time, based on the access control module, the shunt of the edge node registration message and keep-alive message of the edge node with the application data corresponding to the user equipment controlled by the node may be realized. In addition, the operations of node group registration, software installation, software download, remote installation, and certificate/software generation may be implemented by user operations in FIG. 9.

Figure 10:
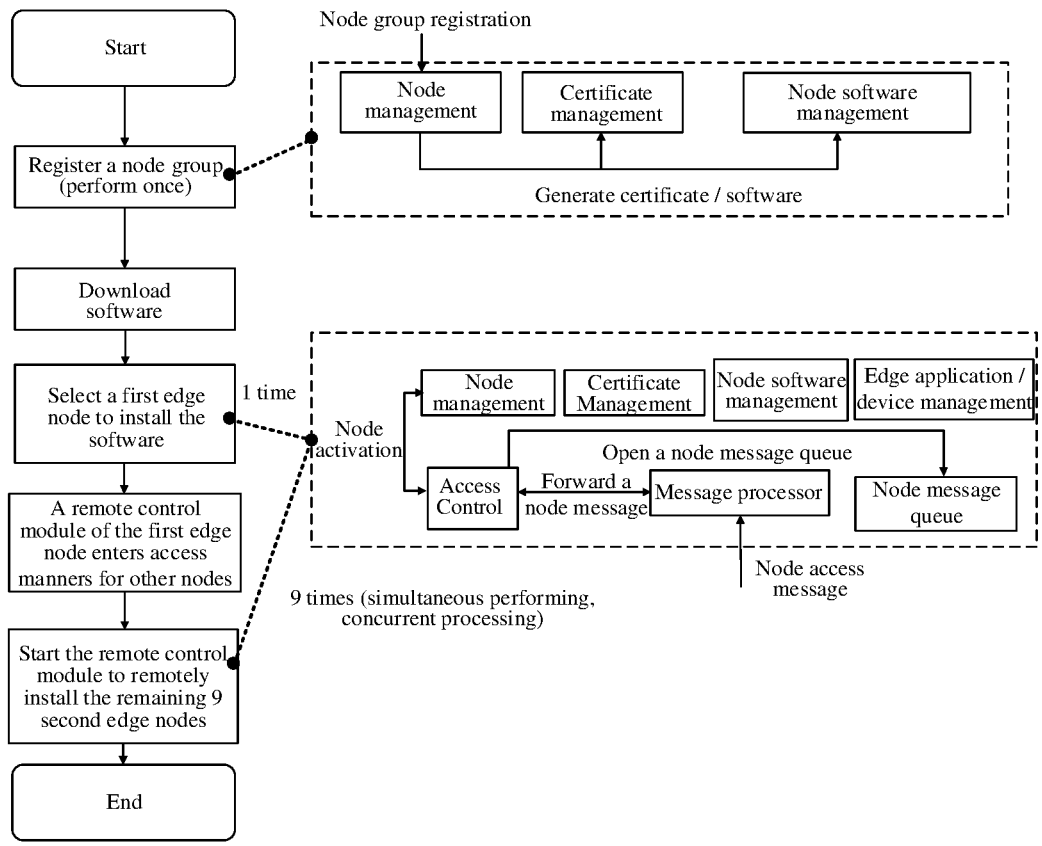
FIG. 10 is a schematic flowchart of access of a node group with 10 edge nodes according to an embodiment of the present disclosure.

FIG. 10 is a schematic flowchart of access of a node group with 10 edge nodes according to the present disclosure. Taking management of 10 edge nodes with community enterprise operating system 7 and CPU type x86_64 as an example, the first edge node performs the start operation and the operation of registering node groups (one node group only needs to be registered once). The node group registration is performed in the management platform on the cloud illustrated in FIG. 9, the corresponding Agent software is downloaded, the first edge node is selected to install the Agent software, the remote control module of the first edge node enters the access manner for other second edge nodes, and starts the remote control module to remotely install the remaining 9 second edge nodes, that is, completing the registration process, which may be performed simultaneously and processed concurrently. The first edge node and the second edge nodes send access information to the cloud after completing the download of the Agent software, to activate the first edge node and the second edge nodes, thereby completing the access process of the edge node group.

Figure 11:
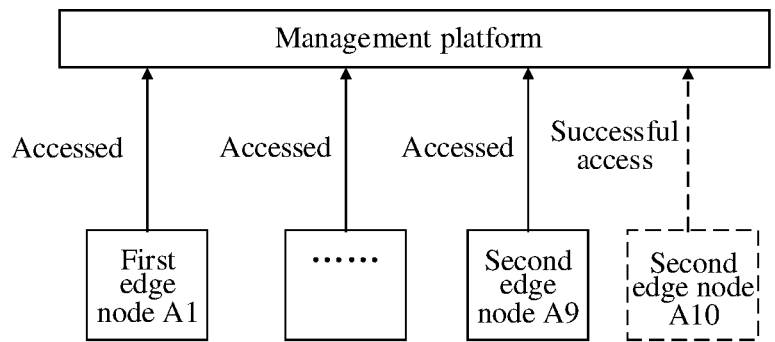
FIG. 11 is a schematic diagram of access of edge nodes to a management platform according to an embodiment of the present disclosure.

FIG. 11 is a schematic diagram of access of edge nodes to a management platform according to an embodiment of the present disclosure. If the maximum number of nodes in node group A is 10, and 9 edge nodes in the node group have been successfully accessed, that is, the first edge node A1 to the second edge node A9 have been accessed to the cloud, in such case, execution of the node access operation will have the following results: when the user manually installs the Agent software on his node, the second edge node may be successfully accessed, that is, the second edge node A10 successfully accesses to the cloud.

Figure 12:
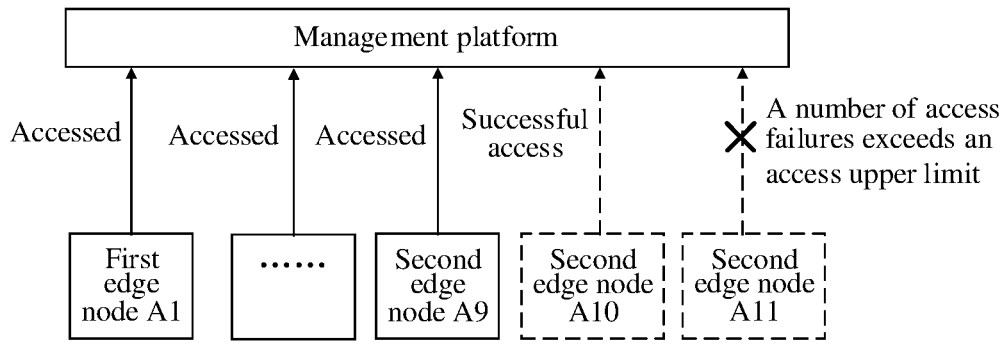
FIG. 12 is a schematic diagram of another access of edge nodes to a management platform according to an embodiment of the present disclosure.

FIG. 12 is a schematic diagram of another access of edge nodes to a management platform according to an embodiment of the present disclosure. When the user installs another two second edge nodes in batches through the remote control module of the existing edge nodes, only one second edge node may successfully access to the management platform, and the other second edge node cannot successfully access because it exceeds the maximum number of management nodes of the node group, and the user may receive an alarm notification that cannot be successfully accessed.

Figure 13:
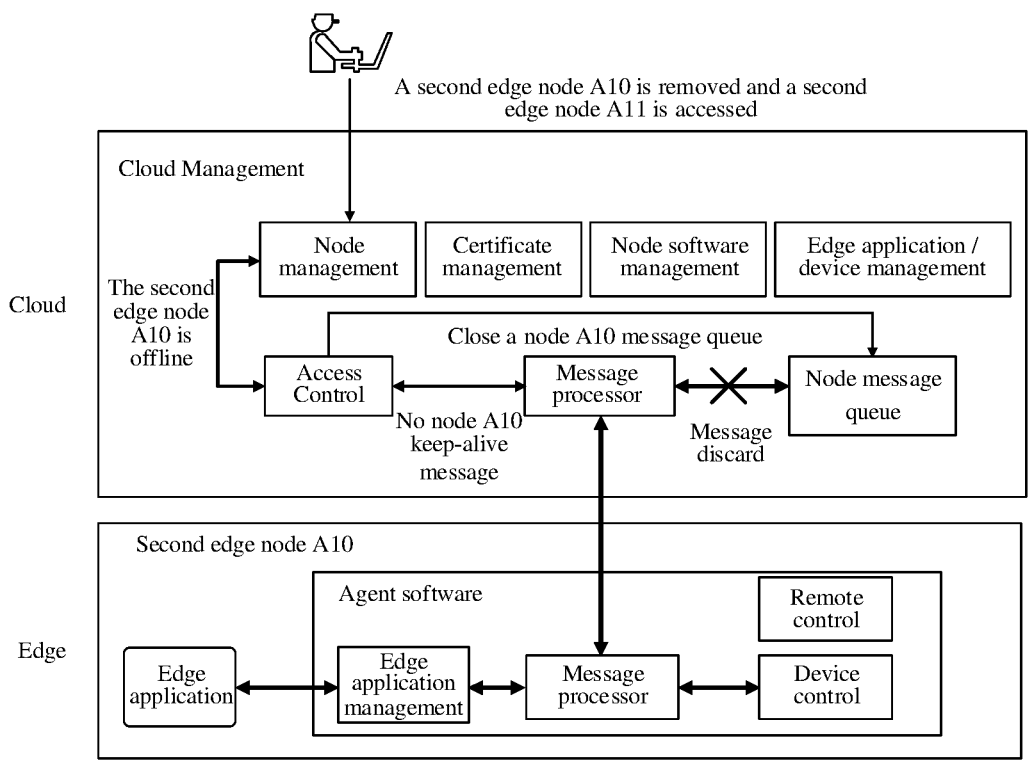
FIG. 13 is a schematic diagram of a message flow of an application and/or a device after an edge node is removed according to an embodiment of the present disclosure.

FIG. 13 is a schematic diagram of a message flow of an application and/or device after an edge node is removed according to an embodiment of the present disclosure. If the maximum number of nodes in the node group A is 10, and one first edge node and 9 second edge nodes in the node group have been successfully accessed, one second node A10 is disconnected from the network, and removed from the cloud so that the cloud no longer manages A10; and then another second edge node A11 is accessed to the cloud, that is, the management platform, and in such case, the number of nodes has reached the upper limit. If the network of the second edge node A10 is restored under the above conditions, the data reported by the application or device in the second edge node A10 will not be processed by the cloud, because the second edge node A10 has been removed from the cloud, the corresponding node message queue is closed, and the data reported by the corresponding application or device will be discarded after passing through the message processor since there is no corresponding node message queue.

Figure 14:
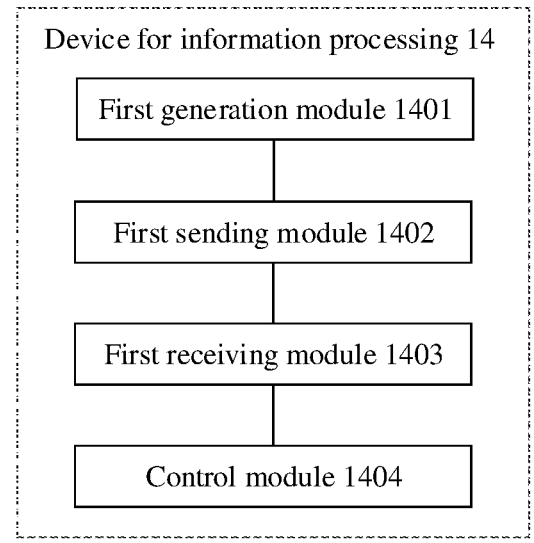
FIG. 14 is a schematic structural diagram of a device for information processing according to an embodiment of the present disclosure.

Based on the foregoing embodiments, the embodiments of the present disclosure provide a device for information processing 14. As illustrated in FIG. 14, a schematic structural diagram of a device for information processing according to an embodiment of the present disclosure is illustrated, and the device for information processing 14 includes a first generation module 1401, a first sending module 1402, a first receiving module 1403 and a control module 1404.

The first generation module 1401 is configured to acquire attribute information of a first edge node and a number of nodes in a node group where the first edge node is located, and generate registration request information based on the attribute information and the number of nodes. The node group includes the first edge node and a second edge node with the same attribute information.

The first sending module 1402 is configured to send the registration request information to a management platform.

The first receiving module 1403 is configured to receive an authentication certificate and a first installation package corresponding to the registration request information sent by the management platform, and install a first application based on the authentication certificate and the first installation package.

The control module 1404 is configured to control, through a remote control module in the first application, the second edge node to install the first application.

In some embodiments of the present disclosure, the control module 1404 is configured to receive access information for accessing the second edge node and determine an access manner based on the access information; parse the first installation package and generate a second installation package; sent the second installation package to the second edge node in the access manner through the remote control module, and control the second edge node to install the first application based on the second installation package.

In some embodiments of the present disclosure, the first sending module 1402 is configured to send first access information to the management platform through the first application based on an identity transport protocol. The first access information is used for the management platform to verify whether the first edge node is accessed normally.

Figure 15:
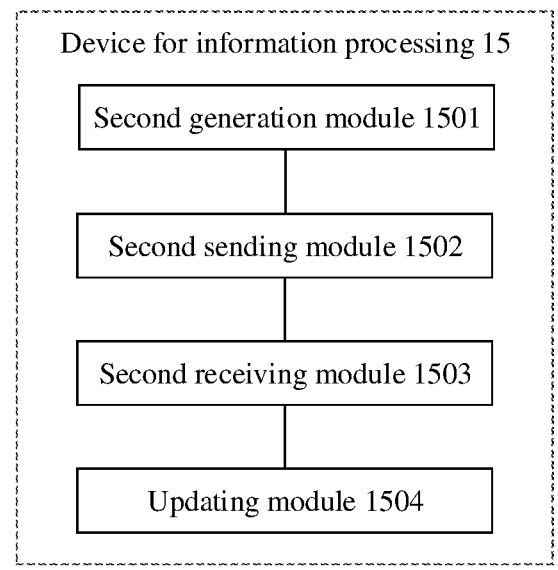
FIG. 15 is a schematic structural diagram of another device for information processing according to an embodiment of the present disclosure.

The embodiments of the present disclosure provide a device for information processing 15. As illustrated in FIG. 15, a schematic structural diagram of a device for information processing according to an embodiment of the present disclosure is illustrated. The device for information processing 15 includes a second generation module 1501, a second sending module 1502, a second receiving module 1503 and an updating module 1504.

The second generation module 1501 is configured to receive registration request information sent by a first edge node, and generate an authentication certificate and a first installation package corresponding to the registration request information.

The second sending module 1502 is configured to send the authentication certificate and the first installation package to the first edge node.

The second receiving module 1503 is configured to receive first access information sent by the first edge node and second access information sent by a second edge node. The first edge node and the second edge node belong to the same node group, and attribute information of the first edge node and the second edge node is the same.

The updating module 1504 is configured to update status information of nodes in response to determining that edge nodes in the node group are accessed normally based on the first access information and the second access information.

In some embodiments of the present disclosure, the second receiving module 1503 is configured to receive, based on an identity transport protocol, the first access information sent by the first edge node through a first application on the first edge node; and receive, based on the identity transport protocol, the second access information sent by the second edge node through a first application on the second edge node. The first application on the first edge node has a first function and a second function, and the first application on the second edge node has the second function.

In some embodiments of the present disclosure, the device for information processing 15 also includes a determination module. The determination module is configured to acquire node group information from the first access information and the second access information; and determine that the edge nodes in the node group are accessed normally based on the node group information.

In some embodiments of the present disclosure, the device for information processing 15 also includes an opening module. The opening module is configured to open a node message queue; and receive, based on the node message queue, first keep-alive information sent by the first edge node and second keep-alive information sent by the second edge node according to a first preset period.

Figure 16:
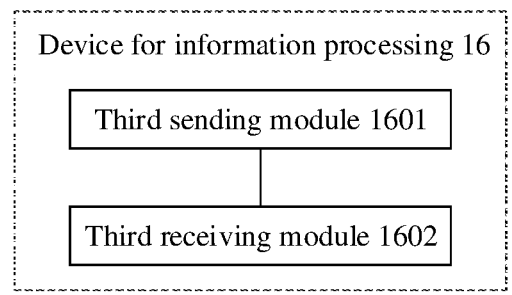
FIG. 16 is a schematic structural diagram of another device for information processing according to an embodiment of the present disclosure.
Figure 17:
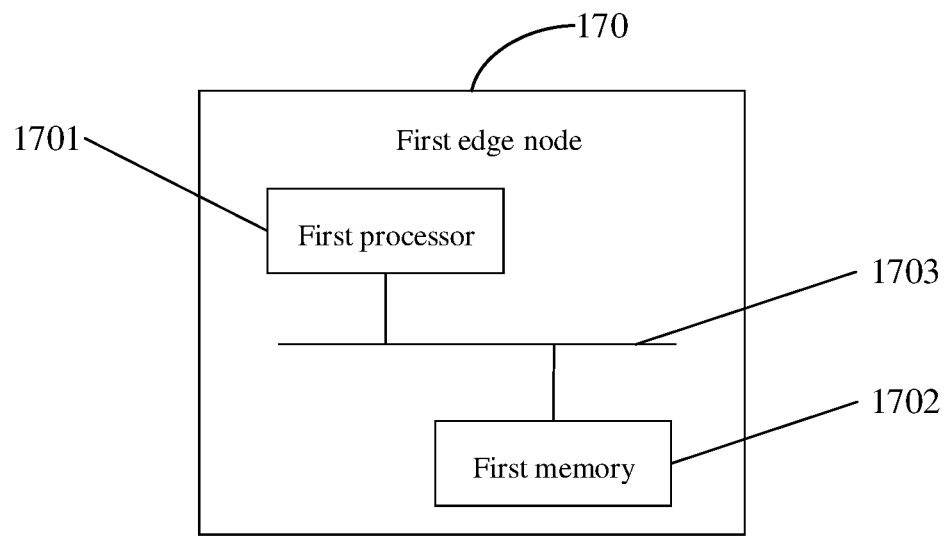
FIG. 17 is a schematic structural diagram of a first edge node according to an embodiment of the present disclosure.

The embodiments of the present disclosure also provide a device for information processing 16. As illustrated in FIG. 16, a schematic structural diagram of a device for information processing according to an embodiment of the present disclosure is illustrated. The device for information processing 16 includes a third sending module 1601 and a third receiving module 1602.

The third sending module 1601 is configured to send access information to a first edge node.

The third receiving module 1602 is configured to receive a second installation package sent by the first edge node based on the access information, and install a first application based on the second installation package.

The third sending module 1601 is configured to send, through the first application based on an identity transport protocol, second access information to a management platform. The second access information is used for the management platform to verify whether a second edge node is accessed normally.

Based on the foregoing embodiments, the embodiments of the present disclosure provide a first edge node 170, which may be applicable to the method for information processing provided by the embodiments corresponding to FIG. 1 and FIG. 4. Referring to FIG. 14, the first edge node 17 may include a first processor 1701, a first memory 1702 and a first communication bus 1703.

The first communication bus 1703 is configured to realize communication connection between the first processor 1701 and the first memory 1702.

The first processor 1701 is configured to execute an information processing program stored in the first memory 1702 to implement the following operations.

Attribute information of the first edge node and a number of nodes in a node group including the first edge node are acquired, and registration request information is generated based on the attribute information and the number of nodes. The node group includes the first edge node and a second edge node with the same attribute information.

The registration request information is sent to a management platform.

An authentication certificate and a first installation package corresponding to the registration request information sent by the management platform are received, and a first application is installed based on the authentication certificate and the first installation package.

The second edge node is controlled to install the first application through a remote control module in the first application.

In some embodiments of the present disclosure, when the first processor 1701 is configured to execute the program stored in the first memory 1702 to control the second edge node to install the first application through the remote control module in the first application, the first processor 1701 may implement the following operations. Access information for accessing the second edge node is received, and an access manner is determined based on the access information; the first installation package is parsed and a second installation package is generated; the second installation package is sent to the second edge node in the access manner through the remote control module, and the second edge node is controlled to install the first application based on the second installation package. The second installation package is generated by parsing the first installation package.

In some embodiments of the present disclosure, after the first processor 1701 is configured to execute the program stored in the first memory 1702 to install the first application based on the authentication certificate and the first installation package, the first processor 1701 may implement the following operations. First access information is sent to the management platform through the first application based on an identity transport protocol, and the first access information is used for the management platform to verify whether the first edge node is accessed normally.

The specific implementation process of the operations performed by the first processor in the present embodiment may refer to the implementation process in the method for information processing provided by the corresponding embodiments of FIG. 1 or FIG. 4.

Figure 18:
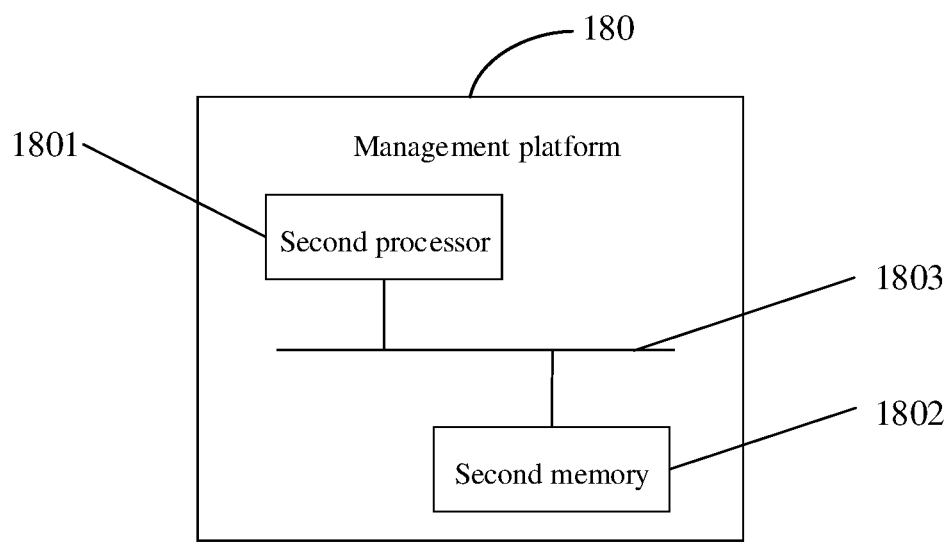
FIG. 18 is a schematic structural diagram of a management platform according to an embodiment of the present disclosure.

Based on the foregoing embodiments, the embodiments of the present disclosure provides a management platform 180, which may be applicable to the method for information processing provided by the corresponding embodiments of FIG. 2 and FIG. 4. Referring to FIG. 18, the management platform 180 may include a second processor 1801, a second memory 1802 and a second communication bus 1803.

The second communication bus 1803 is configured to realize communication connection between the second processor 1801 and the second memory 1802.

The second processor 1801 is configured to execute an information processing program stored in the second memory 1802 to implement the following operations.

Registration request information sent by a first edge node is received, and an authentication certificate and a first installation package corresponding to the registration request information are generated.

The authentication certificate and the first installation package are sent to the first edge node.

First access information sent by the first edge node and second access information sent by a second edge node are received. The first edge node and the second edge node belong to the same node group, and attribute information of the first edge node and the second edge node is the same.

Status information of nodes is updated in response to determining that edge nodes in the node group are accessed normally based on the first access information and the second access information.

In some embodiments of the present disclosure, the second processor 1801 is configured to execute the information processing program stored in the second memory 1802 to receive first access information sent by the first edge node and second access information sent by the second edge node, the second processor 1801 may implement the following operations. Based on an identity transport protocol, the first access information sent by the first edge node through a first application on the first edge node is received. Based on the identity transport protocol, the second access information sent by the second edge node through a first application on the second edge node is received. The first application on the first edge node has a first function and a second function, and the first application on the second edge node has the second function.

In some embodiments of the present disclosure, the second processor 1801 is configured to execute the information processing program stored in the second memory 1802 to determine that edge nodes in the node group are accessed normally based on the first access information and the second access information, the second processor 1801 may implement the following operations. Node group information is acquired from the first access information and the second access information. It is determined that the edge nodes in the node group are accessed normally based on the node group information.

In some embodiments of the present disclosure, after the second processor 1801 is configured to execute the information processing program stored in the second memory 1802 to update the status information of the nodes, the second processor 1801 may implement the following operations. A node message queue is opened. Based on the node message queue, first keep-alive information sent by the first edge node and second keep-alive information sent by the second edge node are received according to a first preset period.

The specific implementation process of the operations performed by the second processor in the present embodiment may refer to the implementation process in the method for information processing provided by the corresponding embodiments of FIG. 2 or FIG. 4.

Figure 19:
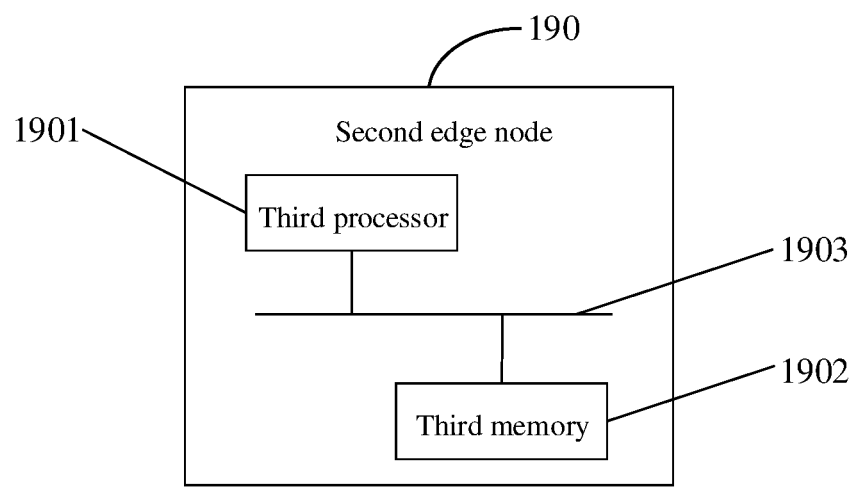
FIG. 19 is a schematic structural diagram of a second edge node according to an embodiment of the present disclosure.

Based on the foregoing embodiments, the embodiments of the present disclosure provides a second edge node 190, which may be applicable to the method for information processing provided by the corresponding embodiments of FIG. 3 and FIG. 4. Referring to FIG. 19, the second edge node 190 may include a third processor 1901, a third memory 1902 and a third communication bus 1903.

The third communication bus 1903 is configured to realize communication connection between the third processor 1901 and the third memory 1902.

The third processor 1901 is configured to execute an information processing program stored in the third memory 1902 to implement the following operations.

Access information is sent to a first edge node.

Based on the access information, a second installation package sent by the first edge node is received, and a first application is installed based on the second installation package.

Second access information is sent to a management platform through the first application based on an identity transport protocol, and the second access information is used for the management platform to verify whether the second edge node is accessed normally.

The specific implementation process of the operations performed by the third processor in the present embodiment may refer to the implementation process in the method for information processing provided by the corresponding embodiments of FIG. 3 or FIG. 4.

According to the first edge node, the management platform and the second edge node provided by the embodiments of the present disclosure, edge nodes of the same type are divided into a group and registered in batches on the management platform, and meanwhile, encryption authentication is performed and the number of nodes in the node group is determined when the management platform performs interact information with the edge nodes. In this way, the registration process of edge nodes of the same type on the cloud is simplified, registration time is shorten, and security of management of edge nodes by the cloud may be improved.

Based on the foregoing embodiments, the embodiments of the present disclosure provide a system for information processing, which includes first edge node, the management platform and the second edge node as provided in the foregoing embodiments.

The embodiments of the present disclosure also provide a computer-readable storage medium, which has stored one or more computer programs thereon that, when run by one or more processors, execute the methods for information processing in the foregoing embodiments. The storage medium may be a volatile or non-volatile computer-readable storage medium.

The embodiments of the present disclosure also provide a computer program, which includes computer-readable codes. When the computer readable codes run in a first edge node or a management platform or a second edge node, a processor of the first edge node is configured to execute to realize the method for information processing applicable to the first edge node, or a processor of the management platform is configured to execute to realize the method for information processing applicable to the management platform, or a processor of the second edge node is configured to execute to realize the method for information processing applicable to the second edge node.

Those skilled in the art will appreciate that embodiments of the present disclosure may be provided as methods, systems or computer program products. Therefore, the present disclosure may take the form of a hardware embodiment, a software embodiment or an embodiment combining software and hardware aspects. Further, the present disclosure may take the form of a computer program product implemented on one or more computer available storage media (including, but not limited to, disk storage and optical storage) including computer-available program code therein.

The disclosure is described with reference to the flowcharts and/or block diagrams of the method, the device (system), and the computer program product according to the embodiments of the disclosure. It should be understood that, each process and/or block in the flowchart and/or block diagram and the combination of processes and/or blocks in the flowchart and/or block diagram may be implemented by a computer program instruction. These computer program instructions may be provided for a processor of a general-purpose computer, a special-purpose computer, an embedded processor or other programmable data processing devices to generate a machine, so that a device for realizing the functions specified in one or more processes of the flowchart and/or one or more blocks of the block diagram is generated through the instruction executed by a processor of a computer or other programmable data processing devices.

These computer program instructions may also be stored in the computer-readable storage medium capable of guiding the computer or other programmable data processing devices to operate in a particular way, so that the instructions stored in the computer-readable storage medium generate a product including an instruction device. The instruction device implements the specified functions in one or more flows of the flowchart and/or one or more blocks of the block diagram.

These computer program instructions may also be loaded on the computer or other programmable data processing devices, so that a series of operations are executed on the computer or other programmable devices to generate the computer-implemented processing, and the instructions executed on the computer or other programmable devices provide the operations for implementing the specified functions in one or more flows of the flowchart and/or one or more blocks of the block diagram.

The above is only preferred embodiments of the present disclosure and is not intended to limit the scope of protection of the present disclosure.

INDUSTRIAL PRACTICALITY

The embodiments of the present disclosure disclose a method for information processing, an apparatus, a device, a medium and a program. The information processing method is applicable to a first edge node, and includes the following operations. Attribute information of the first edge node and a number of nodes in a node group including the first edge node are acquired, and registration request information is generated based on the attribute information and the number of nodes, where the node group includes the first edge node and a second edge node with the same attribute information; the registration request information is sent to a management platform; an authentication certificate and a first installation package corresponding to the registration request information sent by the management platform are received, and a first application is installed based on the authentication certificate and the first installation package; and the second edge node is controlled to install the first application through a remote control module in the first application.

The invention claimed is:

1. A method for information processing, applicable to a first edge node and comprising:
    acquiring attribute information of the first edge node and a number of nodes in a node group comprising the first edge node, and generating registration request information based on the attribute information and the number of nodes, wherein the node group comprises the first edge node and a second edge node with the same attribute information, and the registration request information comprises attribute information of edge nodes in the node group, a number of the edge nodes and a positional relationship between the edge nodes;
    sending the registration request information to a management platform;
    receiving an authentication certificate and a first installation package corresponding to the registration request information from the management platform, and installing a first application based on the authentication certificate and the first installation package, the first application on the first edge node having a first function and a second function; and
    controlling, through a remote control module in the first application, the second edge node to install the first application, the first application on the second edge node having the second function.

2. The method of claim 1, wherein controlling, through the remote control module in the first application, the second edge node to install the first application comprises:
    receiving access information for accessing the second edge node, and determining an access manner based on the access information;
    parsing the first installation package and generating a second installation package; and
    sending, through the remote control module, the second installation package to the second edge node in the access manner, and controlling the second edge node to install the first application based on the second installation package.

3. The method of claim 1, wherein after the first application is installed based on the authentication certificate and the first installation package, the method further comprises:
    sending, through the first application based on an identity transport protocol, first access information to the management platform, wherein the first access information is used for the management platform to verify whether the first edge node is accessed normally.

4. A method for information processing, applicable to a management platform and comprising:
    receiving registration request information sent by a first edge node, and generating an authentication certificate and a first installation package corresponding to the registration request information, wherein the registration request information is generated based on attribute information of the first edge node and a number of nodes in a node group comprising the first edge node, the node group comprises the first edge node and a second edge node with the same attribute information, and the registration request information comprises attribute information of edge nodes in the node group, a number of the edge nodes and a positional relationship between the edge nodes;
    sending the authentication certificate and the first installation package to the first edge node, to enable the first edge node to install a first application based on the authentication certificate and the first installation package and enable a remote control module of the first application on the first edge node to control the second edge node to install the first application, wherein the first application on the first edge node has a first function and a second function, and the first application on the second edge node has the second function;
    receiving first access information sent by the first edge node and second access information sent by the second edge node; and
    updating status information of the edge nodes in the node group in response to determining that the edge nodes in the node group are accessed normally based on the first access information and the second access information.

5. The method of claim 4, wherein receiving the first access information sent by the first edge node and the second access information sent by the second edge node comprises:
    receiving, based on an identity transport protocol, the first access information sent by the first edge node through the first application on the first edge node; and receiving, based on the identity transport protocol, the second access information sent by the second edge node through the first application on the second edge node.

6. The method of claim 4, wherein determining that the edge nodes in the node group are accessed normally based on the first access information and the second access information comprises:
acquiring node group information from the first access information and the second access information; and
determining, based on the node group information, that the edge nodes in the node group are accessed normally.

7. The method of claim 4, wherein after the status information of the edge nodes is updated, the method further comprises:
opening a node message queue; and
receiving, based on the node message queue, first keep-alive information sent by the first edge node and second keep-alive information sent by the second edge node according to a first preset period.

8. A method for information processing, applicable to a second edge node and comprising:
sending access information to a first edge node, wherein the first edge node and the second edge node belong to a same node group, and attribute information of the first edge node and the second edge node is the same;
receiving, based on the access information, a second installation package sent by the first edge node, wherein the second installation package is generated by the first edge node through parsing a first installation package in the first edge node, the first installation package is an installation package received from a management platform and corresponding to registration request information sent by the first edge node to the management platform, and the registration request information is generated by the first edge node based on the attribute information of the first edge node and a number of nodes in the node group comprising the first edge node and comprises attribute information of edge nodes in the node group, a number of the edge nodes and a positional relationship between the edge nodes;
responsive to controlling the second edge node by a remote control module of a first application on the first edge node, installing the first application based on the second installation package, wherein the remote control module is obtained after the first edge node installs the first application based on the first installation package, the first application on the first edge node has a first function and a second function, and the first application on the second edge node has the second function; and
sending, through the first application based on an identity transport protocol, second access information to the management platform, wherein the second access information is used for the management platform to verify whether the second edge node is accessed normally.

9. A first edge node, comprising: a first processor, a first memory and a first communication bus; wherein the first communication bus is configured to implement communication connection between the first processor and the first memory; and
the first processor is configured to execute a program in the first memory to implement a method for information processing, comprising:
acquiring attribute information of the first edge node and a number of nodes in a node group comprising the first edge node, and generating registration request information based on the attribute information and the number of nodes, wherein the node group comprises the first edge node and a second edge node with the same attribute information, and the registration request information comprises attribute information of edge nodes in the node group, a number of the edge nodes and a positional relationship between the edge nodes;
sending the registration request information to a management platform;
receiving an authentication certificate and a first installation package corresponding to the registration request information from the management platform, and installing a first application based on the authentication certificate and the first installation package, the first application on the first edge node having a first function and a second function; and
controlling, through a remote control module in the first application, the second edge node to install the first application, the first application on the second edge node having the second function.

10. A management platform, comprising: a second processor, a second memory and a second communication bus; wherein the second communication bus is configured to implement communication connection between the second processor and the second memory; and
the second processor is configured to execute a program in the second memory to implement a method for information processing, comprising:
receiving registration request information sent by a first edge node, and generating an authentication certificate and a first installation package corresponding to the registration request information, wherein the registration request information is generated based on attribute information of the first edge node and a number of nodes in a node group comprising the first edge node, the node group comprises the first edge node and a second edge node with the same attribute information, and the registration request information comprises attribute information of edge nodes in the node group, a number of the edge nodes and a positional relationship between the edge nodes;
sending the authentication certificate and the first installation package to the first edge node, to enable the first edge node to install a first application based on the authentication certificate and the first installation package and enable a remote control module of the first application on the first edge node to control the second edge node to install the first application, wherein the first application on the first edge node has a first function and a second function, and the first application on the second edge node has the second function;
receiving first access information sent by the first edge node and second access information sent by the second edge node; and
updating status information of the edge nodes in the node group in response to determining that the edge nodes in the node group are accessed normally based on the first access information and the second access information.

11. A second edge node, comprising: a third processor, a third memory and a third communication bus; wherein the third communication bus is configured to implement communication connection between the third processor and the third memory; and the third processor is configured to execute a program in the third memory to implement a method for information processing, comprising:
  sending access information to a first edge node, wherein the first edge node and the second edge node belong to a same node group, and attribute information of the first edge node and the second edge node is the same;
  receiving, based on the access information, a second installation package sent by the first edge node, wherein the second installation package is generated by the first edge node through parsing a first installation package in the first edge node, the first installation package is an installation package received from a management platform and corresponding to registration request information sent by the first edge node to the management platform, and the registration request information is generated by the first edge node based on the attribute information of the first edge node and a number of nodes in the node group comprising the first edge node and comprises attribute information of edge nodes in the node group, a number of the edge nodes and a positional relationship between the edge nodes;
  responsive to controlling the second edge node by a remote control module of a first application on the first edge node, installing the first application based on the second installation package, wherein the remote control module is obtained after the first edge node installs the first application based on the first installation package, the first application on the first edge node has a first function and a second function, and the first application on the second edge node has the second function; and
  sending, through the first application based on an identity transport protocol, second access information to the management platform, wherein the second access information is used for the management platform to verify whether the second edge node is accessed normally.

* * * * *